US006789995B1

(12) United States Patent
Manzi et al.

(10) Patent No.: US 6,789,995 B1
(45) Date of Patent: Sep. 14, 2004

(54) VEHICLE FOR HANDLING SHEET METAL COILS

(76) Inventors: Cristiano Manzi, Via Zamperini, 4/12, Genoa (IT), I-16162; Giorgio Pastorino, Via Marco Sala, 29/9, Genoa (IT), I-16167

( * ) Notice: Subject to any disclaimer, the term of this patent is extended or adjusted under 35 U.S.C. 154(b) by 81 days.

(21) Appl. No.: 10/048,920

(22) PCT Filed: Jul. 31, 2000

(86) PCT No.: PCT/EP00/07398

§ 371 (c)(1),
(2), (4) Date: Jun. 7, 2002

(87) PCT Pub. No.: WO01/10766

PCT Pub. Date: Feb. 15, 2001

(30) Foreign Application Priority Data

Aug. 5, 1999 (IT) ........................................ SV99A0024

(51) Int. Cl.[7] ................................................ B60P 3/035
(52) U.S. Cl. ....................... 414/460; 212/317; 212/344; 414/910
(58) Field of Search ................................ 414/460, 459, 414/910, 911; 212/344, 317

(56) References Cited

U.S. PATENT DOCUMENTS 3,433,459 A * 3/1969 Logan ........................ 254/281
3,698,581 A * 10/1972 Goyarts ...................... 414/460
3,807,591 A * 4/1974 Zinno et al. ................ 414/460
4,200,162 A * 4/1980 Tax ............................ 180/23
5,368,434 A * 11/1994 Kress et al. ................ 414/460
5,437,531 A * 8/1995 Kress ......................... 414/555
5,888,043 A * 3/1999 Jatcko ........................ 414/459
6,293,747 B1 * 9/2001 Thomas ...................... 414/460

FOREIGN PATENT DOCUMENTS

FR 1293619 * 4/1962 ................. 414/460
IT 404676 * 8/1943 ................. 414/460

* cited by examiner

*Primary Examiner*—Thomas J. Brahan
(74) *Attorney, Agent, or Firm*—James Creighton Wray; Meera P. Narasimhan

(57) ABSTRACT

The invention pertains to a vehicle for handling coils (2), particularly sheet metal coils, or the like. According to the invention, the vehicle comprises a bridgelike frame structure (1) which forms a tunnel (3) all along the vehicle, for the passage of coils (2) while they lay on the ground, having height and width dimensions slightly greater than the corresponding dimensions of the coils (2), means (18) for griping the coils (2) and means (10) for lifting the coils (2). In accordance with an advantageous improvement, the tunnel (3) is at least partly upwardly open, to allow the coils (2) to be lifted above the height of the tunnel (3). The invention also addresses a combination of the vehicle with a store for coils (2), wherein coils (2) are arranged axially side-by-side on rows (A, B, C, D), whose distance from each other depends on the wheel gauge of the vehicle.

30 Claims, 10 Drawing Sheets

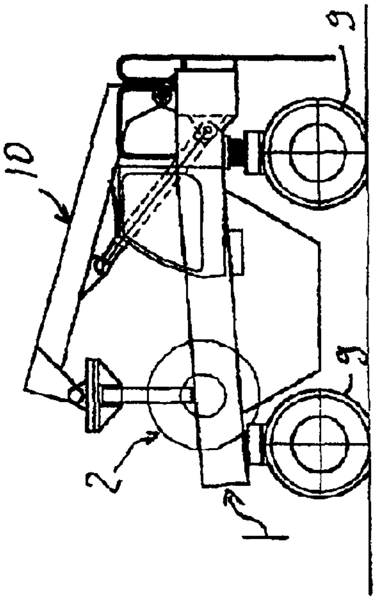
Fig. 8
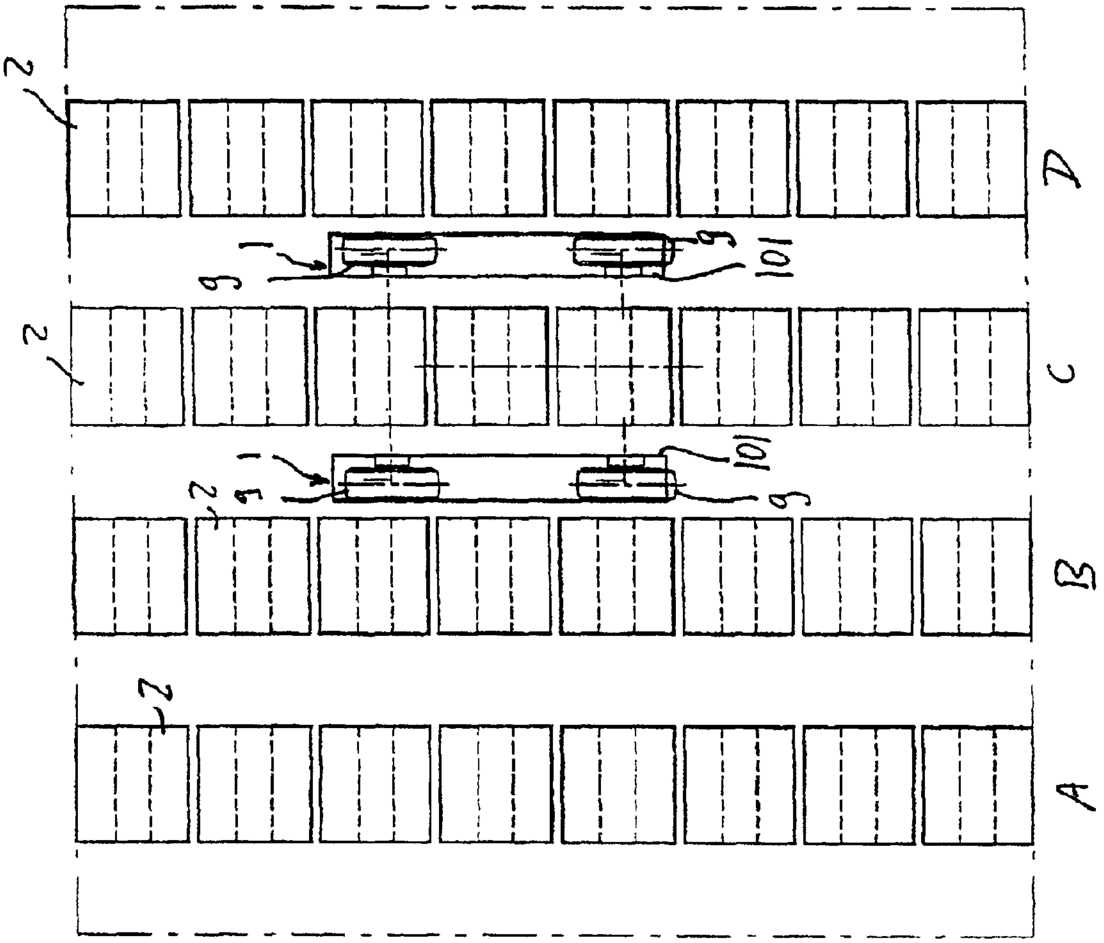

VEHICLE FOR HANDLING SHEET METAL COILS

BACKGROUND OF THE INVENTION

The invention pertains to a vehicle for handling coils, particularly sheet metal coils, or the like.

It is known to those skilled in the art that, after manufacture, sheet metal coils are arranged axially side by side on usually parallel rows, on a stockyard. Then, these coils are loaded on a motor vehicle or on another transportation means for being transferred to their final destination.

Coils are typically handled by using lift trucks, the so-called dollies, whose means for engaging and lifting the coils generally consist of a boom extending horizontally forward beyond the front side of the lift truck. A lift truck having these features must be axially aligned with the coil to be lifted, which means that the longitudinal axis of the truck, while the coil is lifted, must be perpendicular to the row of coils.

These known lift trucks have rather huge longitudinal dimensions, and the above constrained coil lifting position requires the coils to be stocked in widely spaced rows, i.e. at a distance slightly longer than the length of the truck, to allow the vehicle to access and be driven between two adjacent rows.

Even when a lift truck with a lifting boom extending transversely to the longitudinal axis of the truck is provided, the distance between the adjacent coil rows should be at least slightly greater than the overall width of the vehicle. (See FIG. 9).

For this reason, very wide stockyards are necessary for the coils, as compared with the space actually required by the coils, and this, due to the high cost of industrial areas, has a negative impact on the final cost of coils. Moreover, for the same reasons, the operations for loading a transportation vehicle also require a considerable space, at least on one side of the vehicle, since the lift truck with the above characteristics may perform the vehicle loading operation from one side position only. Further, the series of controls required by the lift truck for handling coils is quite time-consuming.

SUMMARY OF THE INVENTION

Hence, the invention has the object of obviating the above drawbacks and of providing, by simple and relatively inexpensive arrangements, a vehicle such as the one described hereinbefore which allows to drastically reduce the space required for stocking coils and allows easy and fast handling thereof, while saving time as compared with prior art systems. A further abject of the present invention is to make the operations for loading/unloading transport motor vehicles simpler, faster and safer, while reducing the overall space required for these operations.

The invention achieves the above purposes by providing a vehicle as described hereinbefore which comprises a bridgelike frame structure, which forms a tunnel all along the vehicle for the passage of the coils while they lay on the ground. As described in greater detail hereafter, this feature also allows a row of coils to pass through the tunnel, particularly in an axial side-by-side position.

This tunnel is dimensioned in such a manner as to have a height and a width corresponding to, or substantially slightly greater than those of the coil.

The vehicle according to the invention is further provided with means for gripping the coil and with means for lifting it.

Advantageously, the tunnel may be arranged to be at least partly upwardly open, so that the coil may be lifted above the height of the tunnel, i.e. taken out through the top of the tunnel.

Moreover, the tunnel may be dimensioned in such a manner as to allow the passage of the vehicle above the coil (or above a row of coils), in a condition in which ID the axis of the coils is parallel to the ground and perpendicular to the longitudinal axis of the vehicle.

In accordance with a preferred embodiment, the bridge-like frame structure may consist of a pair of framework longitudinal members, the distance therebetween corresponding to, or being slightly greater than the axial dimension of the coils, and of a transverse structure for connecting the two longitudinal members, which is disposed at a height above the diameter of the coils.

The frame structure may have at least four wheels with independent axles, so that no hindrance element is provided inside the tunnel, as would be the case, e. g. if sets of wheels with common axles were provided.

Each wheel is preferably provided at the end of each longitudinal member. This arrangement obviously provides an excellent base for the vehicle to lay on the ground.

The distance between the wheels of each front and rear set may be equal to or greater than the distance between the two longitudinal members, to allow the passage of the vehicle above the coil, while the latter lays on the ground.

The transverse connecting structure way include an operating cab and controlling and operating means.

Advantageously, the transverse structure may be limited to a portion of the longitudinal extension of the framework, particularly to the rear half of the frame. Thus, the front half of the tunnel may be arranged to open upward to allow the coil to be lifted. As is better described hereafter in the drawings, this feature also allows to obtain an optimal visibility of the operations from the operating cab of the vehicle, better than the one provided by prior art lift trucks. This feature constitutes an important safety factor for coil handling operators.

The means for lifting the coils may also consist of a crane-type boom, being articulated to the rear of the vehicle.

This lifting boom may be composed of at least two elements articulated together.

Alternatively, the lifting boom may consist of a single element, or of at least two sliding telescoping elements obviously, any other type of lifting boom, with any geometry, may be provided.

The means for driving the boom say consist of at least one linear actuator, but preferably of a pair of linear actuators, particularly of the oleo-pneumatic type. Each actuator is articulated between an intermediate portion of the boom, or of the boom element articulated to the vehicle, and one of the two longitudinal frame embers.

Alternatively thereto or in combination therewith, the at least one linear actuator may be articulated at one of its ends in an intermediate position of the boom, or of the boom element articulated to the vehicle, and at the opposite end to the transverse structure for connecting the two longitudinal frame members. Both the above described arrangements allow to avoid any hindrance element in the front portion of the vehicle, designed for the upward passage of the coils, and to maintain an excellent visibility of all operations performed by the operator from the cab.

The means for gripping the coils may consist of a gripper, consisting of at least two movable jaws. Each jaw may have at least one lifting tooth, oriented axially with respect to the coil, and being such that it can be engaged in one of the two opposite ends of the central cavity of the coil. The jaws may be driven toward/away from each other into a position of engagement with or disengagement from the coil.

Advantageously, the gripper may be mounted on a device, the so called "gripper rotary actuator", rotating about an axis perpendicular to the axis of the coil, with a motorized orientation. As described in further detail hereafter, this improvement is particularly useful, for instance, for loading transportation means from a side position, like in the case of railway cars.

The gripper may be mounted on the rotating device through sliding means which drive it relative to the rotating device, for centering the gripper with respect to the coil, immediately prior to lifting thereof.

The distance between the two longitudinal frame members, i.e. the width of the tunnel, particularly of the upwardly open portion thereof, may be longer than the dimension of the gripper in the open position, i.e. when the jaws are in the spaced apart condition, to allow the passage of the gripper, for instance for lifting a coil situated within the dimensional limits of the vehicle.

The motor drive may be provided in the longitudinal lateral frame members, e.g. two separate motors, one for each longitudinal member, and/or in the area of the transverse structure for connecting the two longitudinal frame members, e.g. a single motor, in a compartment provided at a height from the ground above the diameter of the coil and/or in compartments provided at the longitudinal frame members. All the above arrangements relating to motor drive location allow to avoid any hindrance element projecting inside the tunnel. The motor drive elements also have the function of ballasting the vehicle while improving its stability in any operating condition.

Means for steering and braking control on at least one of the front/rear set of wheels may be also provided. These means may be arranged to be independent for each wheel and have a control unit and control transmissions, drives, wiring and/or piping branching off the operating cab towards the sets of wheels along the longitudinal frame members.

The steering and braking devices may be provided at the side longitudinal members of the frame.

Each wheel may be mounted on an independent axle section, associated to the corresponding lateral longitudinal frame member. Independent braking and/or steering actuators may be associated to each wheel or to at least some of the wheels, and be connected to a synchronized and/or coordinated control unit therefor. Said unit is in turn connected to controls in the operating cab. Here again, the above described arrangement of said parts provides the advantage of avoiding the presence of hindrance elements in the tunnel.

At least one or both sets of front/rear wheels of the vehicle may be provided as steering wheels, and particularly both sets of wheels may be arranged to allow orientation through 90 degrees relative to the longitudinal axis of the vehicle, to allow lateral translation thereof and further reduce driving spaces.

When a single motor is provided, it may be connected to each driven wheel, through separate drives for each wheel, extending within the corresponding longitudinal lateral frame members. Alternatively, each driven wheel may be provided with its own motor, located in the vicinity of the wheel.

Advantageously, the distance between the two longitudinal frame members and the height from the ground of the transverse structure for connecting the two longitudinal members, may be slightly greater than the corresponding dimensions of loading platforms of transport vehicles, to allow the vehicle to be loaded in a condition in which the loading platform of the vehicle is inside the tunnel of the vehicle, thereby apparently saving the space required by the vehicle of the invention for vehicle loading operations.

This invention also provides a combination of the vehicle described heretofore, with a coil store, wherein the coils are disposed in an axial side-by-side arrangement on parallel rows, and wherein said rows may be spaced in accordance with the width of each of the longitudinal frame members of the vehicle, and in accordance with the wheel gauge of the vehicle. Thanks to these arrangements, as described in greater detail hereafter, the vehicle may be arranged to pass above each row of coils and lift the coils in a position in which the vehicle is axially aligned with the row of coils, with a drastic reduction of the distance required between adjacent rows of coils.

The advantages of the present invention are apparent from the above disclosure, and consist in that a vehicle may be provided which allows easy, safe and fast handling of coils, time being saved as compared with the time required by currently used prior art lift trucks; a drastic reduction of the size of the necessary spaces for stocking coils; further, thanks to this invention, the operations for loading/unloading transport vehicles may made simpler, faster and safer, while the space required thereby is further reduced.

Further characteristics and possible improvements of the invention will form the subject of the dependent claims.

The characteristics of the invention and the advantages derived therefrom will appear more clearly from the following detailed description of the annexed figures, in which:

BRIEF DESCRIPTION OF THE DRAWINGS

FIG. 8 is a plan view of a vehicle and of a coil store according to the invention.

DETAILED DESCRIPTION OF THE PREFERRED EMBODIMENT

Figure 1:
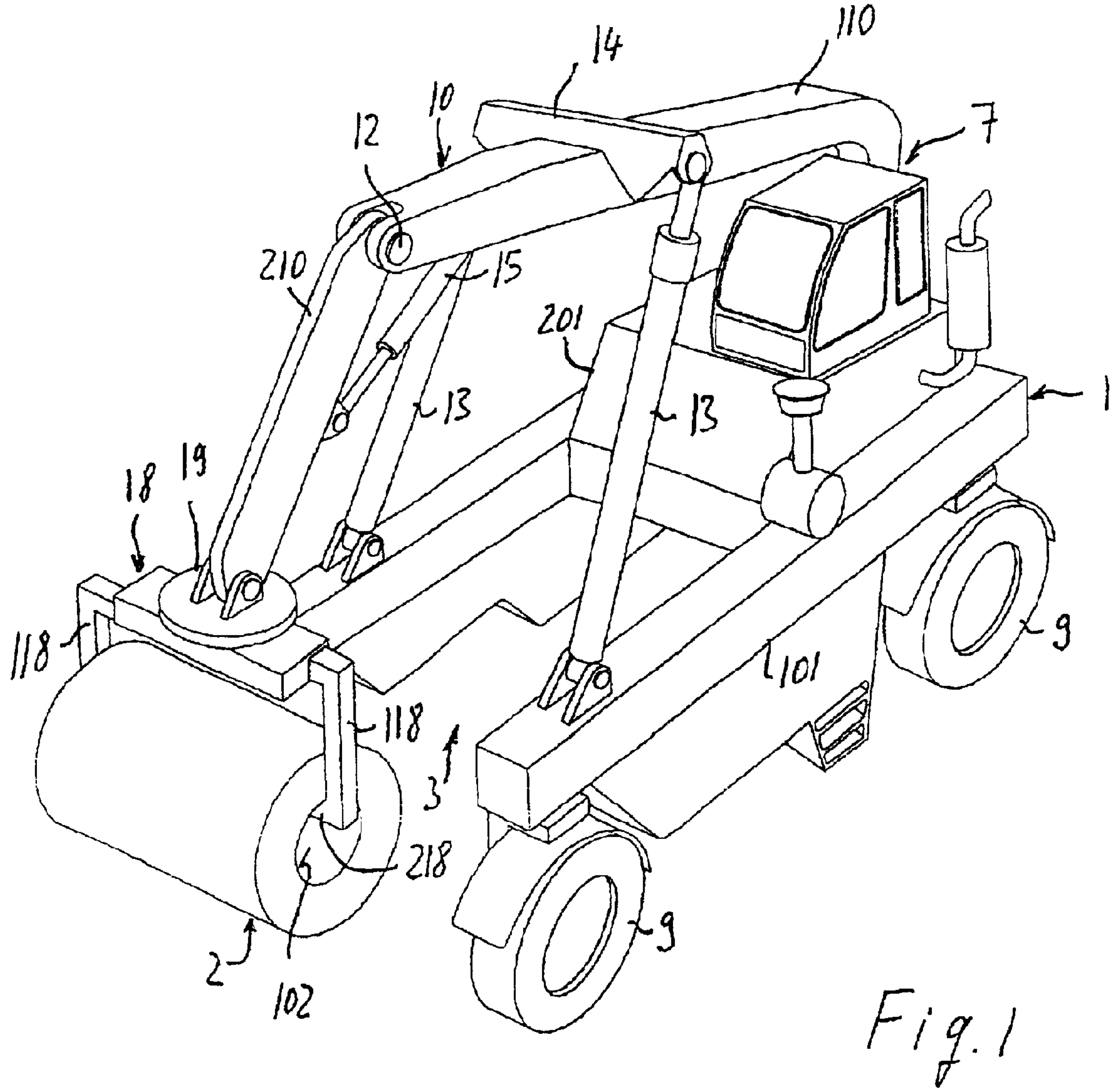
FIG. 1 a perspective view of a first embodiment of the vehicle according to the invention, in a coil lifting condition.

Referring to FIG. 1, a vehicle according to the invention includes a bridgelike frame structure 1. Said structure 1 essentially comprises a pair of longitudinal members 101 of the framework 1, and a transverse structure 201 for connecting together the two longitudinal members 101. The two longitudinal members 101 are spaced to an extent corresponding to or at least slightly greater than the axial dimension of the coils 2, whereas the transverse connecting structure 201 is provided at a height from the ground which is slightly above the diameter of the coils 2. The pair of longitudinal members 101 and the transverse structure 201 are disposed in such a manner as to form, combined together, a tunnel 3 which extends all along the vehicle. Thanks to the above described arrangement of the longitudinal members 101 and of the transverse structure 201, the tunnel 3 has height and width dimensions corresponding to or substantially slightly greater than those of the coil 2. Thanks to this arrangement, the coil 2, when lying on the ground, and in a condition in which its axis is parallel to the ground and perpendicular to the longitudinal axis of the vehicle, may pass through the tunnel 3, i.e. the vehicle may easily pass above a coil lying on the ground, and advantageously above a row 4 of axially adjacent coils 2 (FIG. 8), with the advantages described hereafter.

Figure 6:
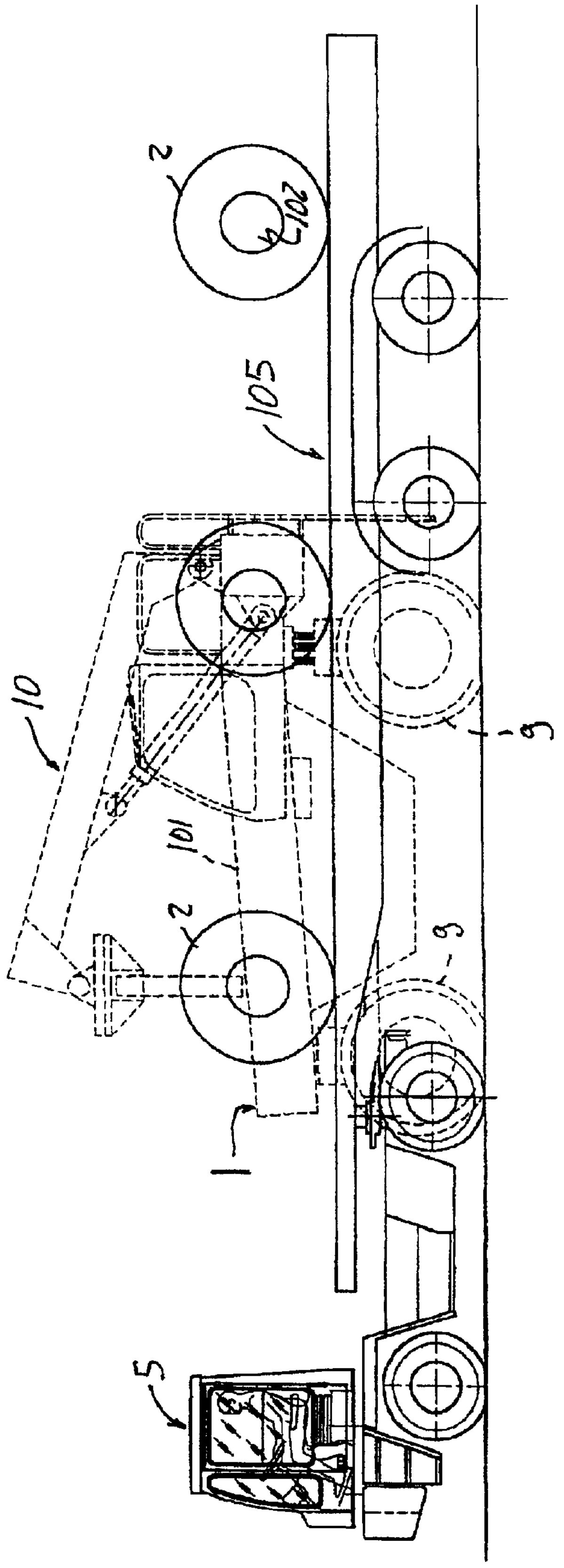
FIG. 6 shows the operation for loading a transport vehicle in a condition in which the loading platform of the vehicle is inside the tunnel of the vehicle of FIG. 3.

The transverse structure 201 extends through a portion of the length of the framework 1, particularly substantially for the rear half of the frame 1. Thanks to this arrangement, the tunnel 3 has an upward opening 103 which allows the coils 2 to be lifted above the height of the tunnel 3 and, if desired, to be moved to a condition in which they are lifted from the ground and into a position in which they are within the dimensional limits of the vehicle. This arrangement increases the stability of the vehicle while the coils 2 are hauled, e.g. towards a transport motor vehicle 5 (FIG. 6). It has to be further noted that, if the diameter of the coil 2 is not greater than its axial dimension, then the coil 2 may be also lifted and hauled in a condition in which its axis is aligned with that of the vehicle.

Referring to FIG. 1 again, the transverse connecting structure 201 comprises an operating cab 7, wherein controlling and operating means, like those used for crane trucks, or the like, are provided. The cab 7 may be provided in a raised position (FIG. 2) relative to the longitudinal ambers 101, or substantially level therewith (FIG. 3). The cab 7 is provided sideways (FIGS. 5A and 5B) relative to the median longitudinal axis of the vehicle, so that it cannot interfere with the means for lifting the coils 2, which are described below in greater detail. It has to be further noted that, thanks to the overall architecture of the vehicle, and to the position of the cab, the operator 8 has an optimized vision of all coil handling steps (FIG. 4), and this enhances safety and user-friendliness features of the vehicle as compared to currently used lift trucks.

Referring again to FIG. 1, the frame structure 1 has four wheels 9, each being provided substantially at an end of each longitudinal member 101, so that a wide base for the vehicle to rest is obtained. For particular needs, there may be provided a different number of wheels and/or vehicle driving means other than wheels, such as tracks or the like.

The distance between the wheels 9 of each set of front or rear wheels 9 is slightly longer than the distance between the two longitudinal members 101, and each wheel 9 is mounted on a separate axle section which is associated to the corresponding lateral longitudinal portion 101 of the frame 1, so that no hindrance elements are present in the tunnel 3, which might restrain the passage of the coils 2.

The vehicle being the object of the invention has means for lifting the coils 2, consisting of a boom 10 of the crane type, which is articulated 11 to the rear of the vehicle, particularly at the rear of the transverse structure 201 and equally distant from both longitudinal members 101 of th frame 1.

Figure 2:
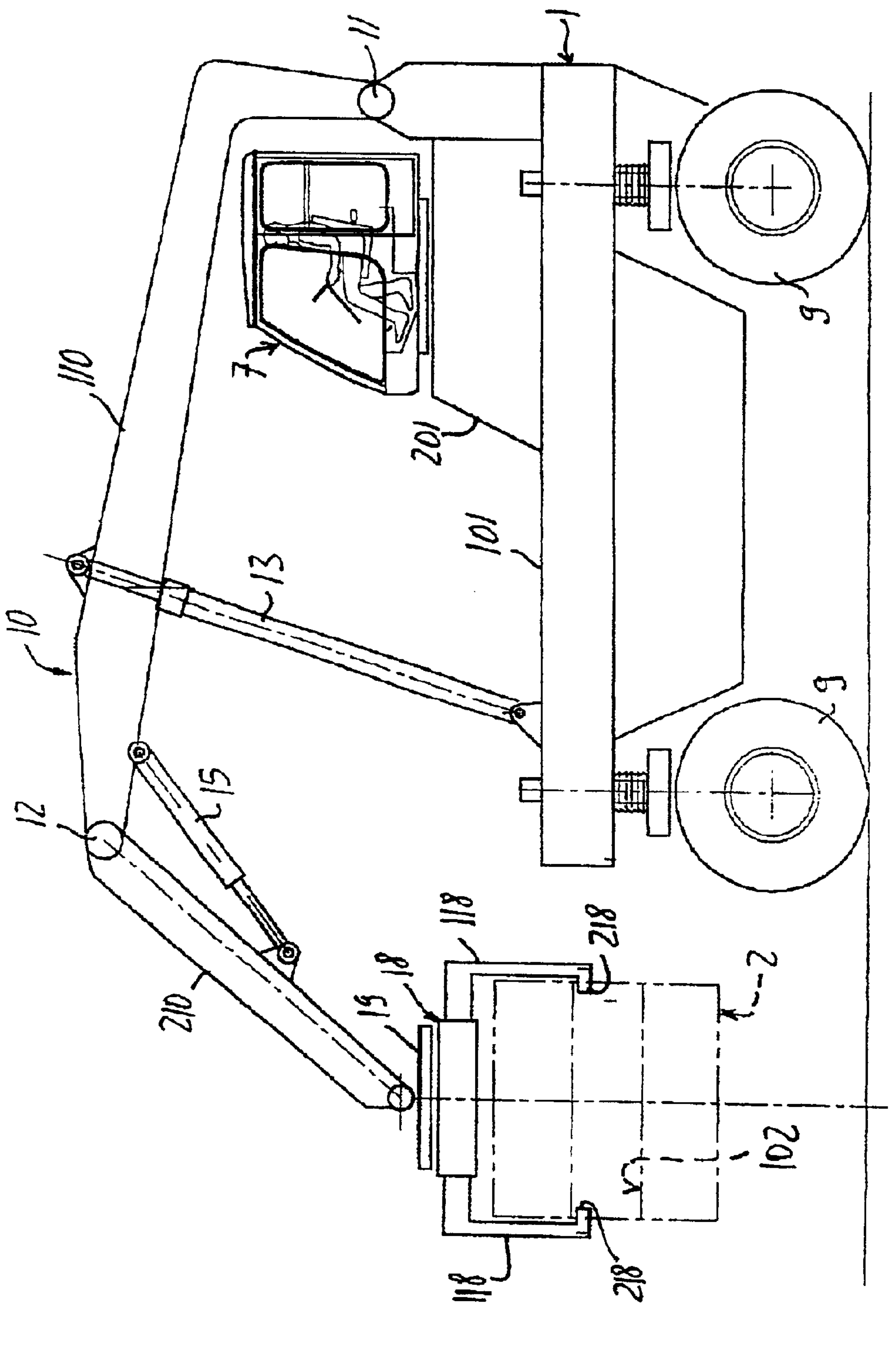
FIG. 2 is a side view of the vehicle as shown in FIG. 1.
Figure 3:
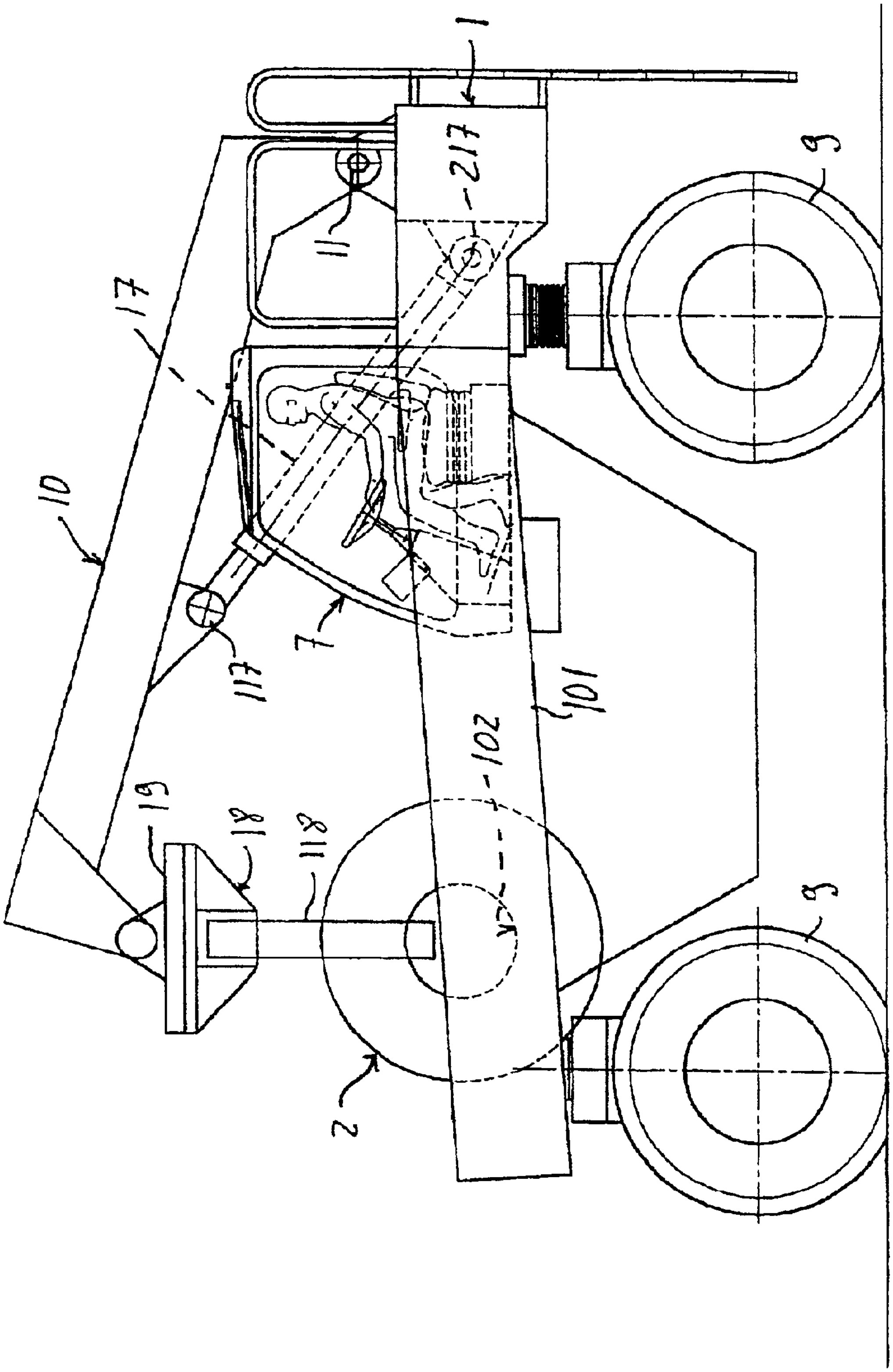
FIG. 3 is a side view of a second embodiment of the vehicle according to the invention, in a coil lifting condition.
Figure 4:
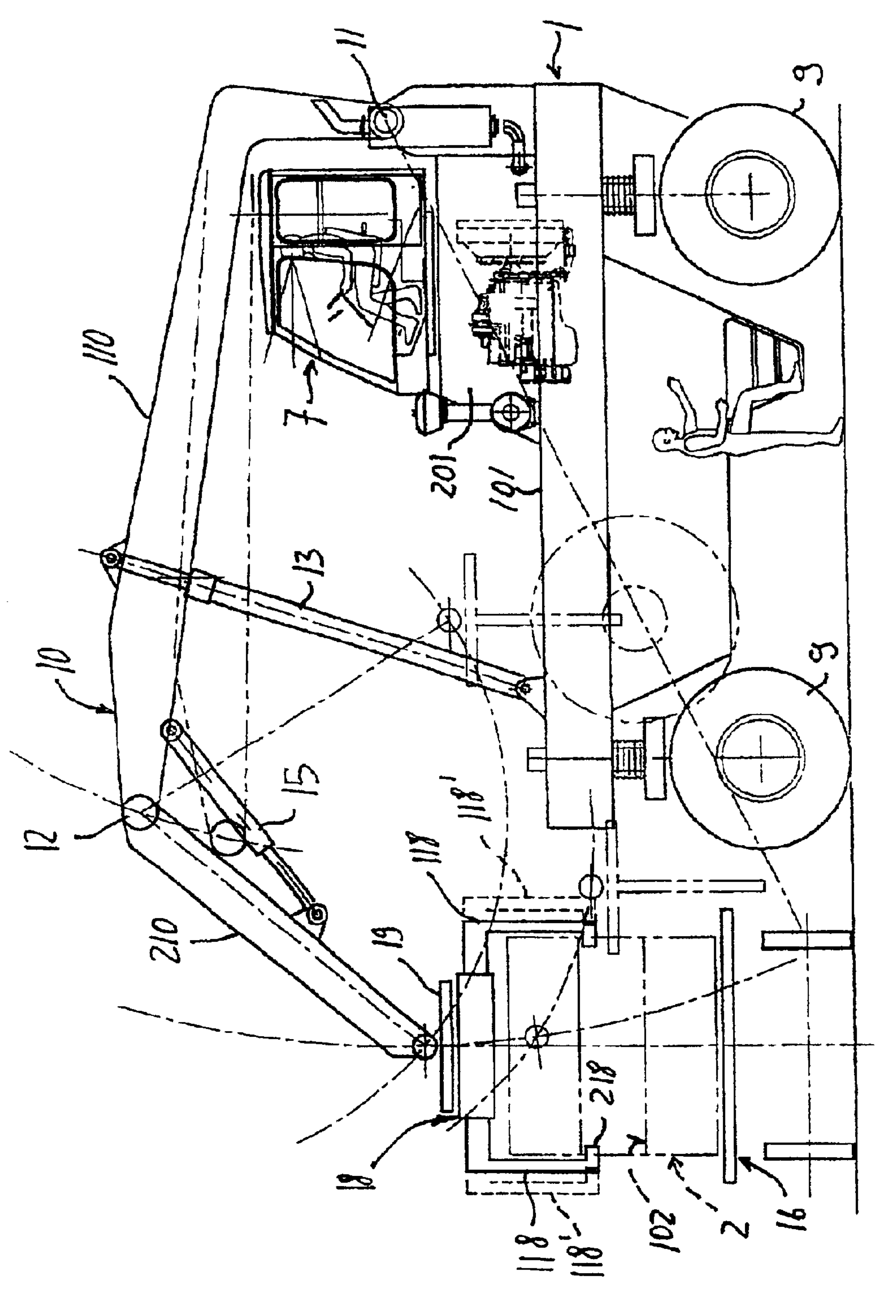
FIG. 4 shows the operation for side loading a transportation means, performed with the vehicle of FIG. 2, and shows different possible positions of the lifting boom and of the means for gripping the coil.

In the embodiment as shown in FIGS. 1, 2 and 4, the boom- 10 is composed of two elements 110, 210 articulated 12 to each other, but there may be provided an articulated boon composed of a greater number of elements. The first element 110 of the boom 10 is L-shaped, and is articulated at one end to the transverse structure 201 by means of an articulation pivot 11 or the like. The second element 210 of the boom 10 is articulated to the opposite end of the first element 110 by means of another articulation pivot 12. At the free end of the second element 210 of the boom 10 there are provided the means for gripping the coils 2, which are described in greater detail hereafter.

Still relating to the boom 10, this in provided with lifting means, consisting of a pair of linear actuators 13, particularly of the oleo-pneumatic type, each being articulated between an intermediate portion of the first element 110 of the boom 10 and the front portion of one of the two longitudinal embers 101 of the frame 1. Advantageously, the first element 110 of the boom 10 has a transverse element 14, to whose opposite ends the two linear actuators 13 are articulated. The second element 210 of the boom 10 may be swung by a further linear actuator 15, which is articulated between an intermediate portion of the second element 210 and a portion of the first element 110 of the boom 10, between the transverse element 14 and the end with the articulation pivot 12. Pig. 4 shows with continuous lines the boom 10 in a specific position, and with dashed lines a few more options for swinging the two elements 110, 210 of the boom 10. It is to be further noted that, thanks to the considerable range, particularly allowed by the second element 210, the loading/unloading operation may be also performed from a side position, relative to the transportation means wherefor such loading method is preferable, such as in the case of railway cars 16 or the like.

Alternatively (FIG. 3), the boom 10 may consist of a single element, articulated 11 to the rear of the vehicle, or of two or more sliding telescoping elements, one of which is articulated 11 to the rear of the vehicle. There may be provided a single linear actuator 17, or a pair of actuators, articulated at one end 117 into an intermediate position of the boom 10, or of the boom element articulated to the frame 1, and at the opposite end 210 to the rear of the transverse structure 201 for connecting the two longitudinal members 101 of the frame 1. Obviously, there may be provided any other boom geometry, whether or not articulated, whether or not extensible, and any known arrangement for driving it, provided that, like in the preceding embodiments, the means for driving it are articulated into upper or lateral portions in relation to the aperture for the passage of the coil/s 2.

Still with reference to FIG. 1, the vehicle in accordance with the present invention includes means for gripping the coils 2, consisting of a gripper 18, formed by two movable jaws 118, which may be slid toward or away from each other. Each jaw 118 has a lifting tooth 218, oriented axially with respect to the coil 2, and being such that it can be engaged in one of the two opposite open ends 102 of the coil 2. FIG. 4 shows with continuous lines the two jaws 118 while they are driven toward each other and engaged with the coil 2 (closed gripper), and in dashed lines the jaws 118' while they are driven away from each other and disengaged from the coil 1 (open gripper).

The gripper 18 is mounted on a device 19 which rotates about an axis perpendicular to the axis of the coil 2. This arrangement advantageously allows to orient the coil through several angles, on a plane parallel to the ground plane. This gives the vehicle a much better versatility as compared with currently used lift trucks. Obviously, the rotating device 19 may be omitted if the vehicle is designed to lift and haul coils 2 whose position is always the one shown in figs. 3 and 7, i.e. wherein the axis of the coil 2 is always perpendicular to the longitudinal axis of the vehicle.

The gripper 18 is mounted on the rotating device 19 through sliding means, which drive it relative to the rotating device 19, which may consist, for instance, of slide rails and of a corresponding gripper-carrying carriage, to allow centering of the gripper 18 relative to the coil 2, thereby avoiding the need for the operator to move the whole vehicle to center the gripper relative to the coil 2.

Figure 7:
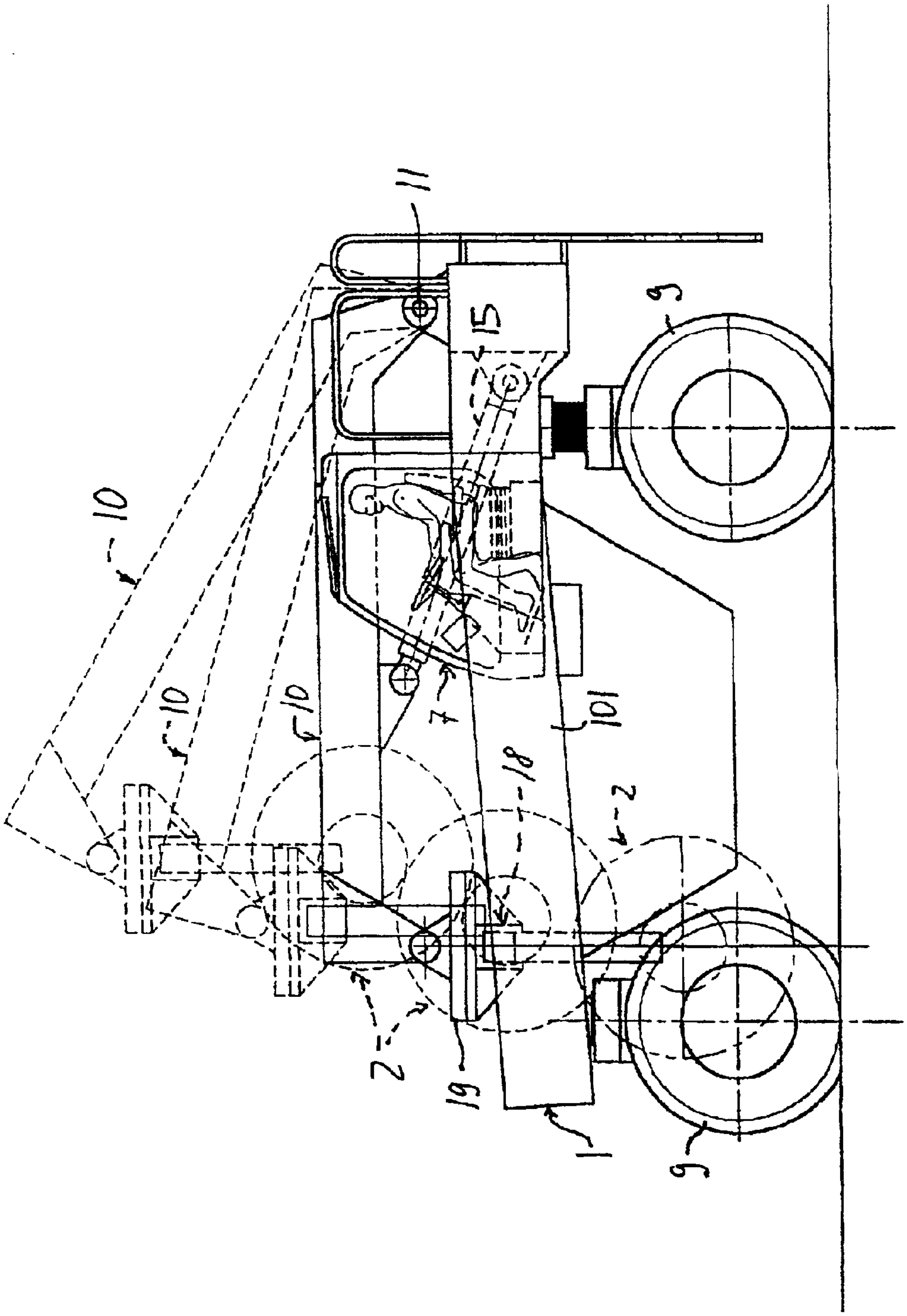
FIG. 7 shoes the steps for lifting a coil by the vehicle as own in FIG. 3.

Advantageously, the distance between the two longitudinal embers 101 of the frame 1 is slightly greater than the width of the gripper 18 in a spaced apart condition of the jaws 118, to allow gripping and lifting of the coil 2 even in a condition in which the latter is positioned inside the tunnel 3 and in coincidence with the opening 103 (FIGS. 3 and 7).

In the embodiment as shown in FIG. 4, the motor drive 20 is housed in a compartment provided in the area of the transverse structure 201, but it may be arranged to be housed wholly or partly inside one or both longitudinal members 101, or in compartments provided above or below said members 101, so that no hindrance parts are present inside the tunnel 3 and that the width dimension of the vehicle is not increased.

Figure 9:
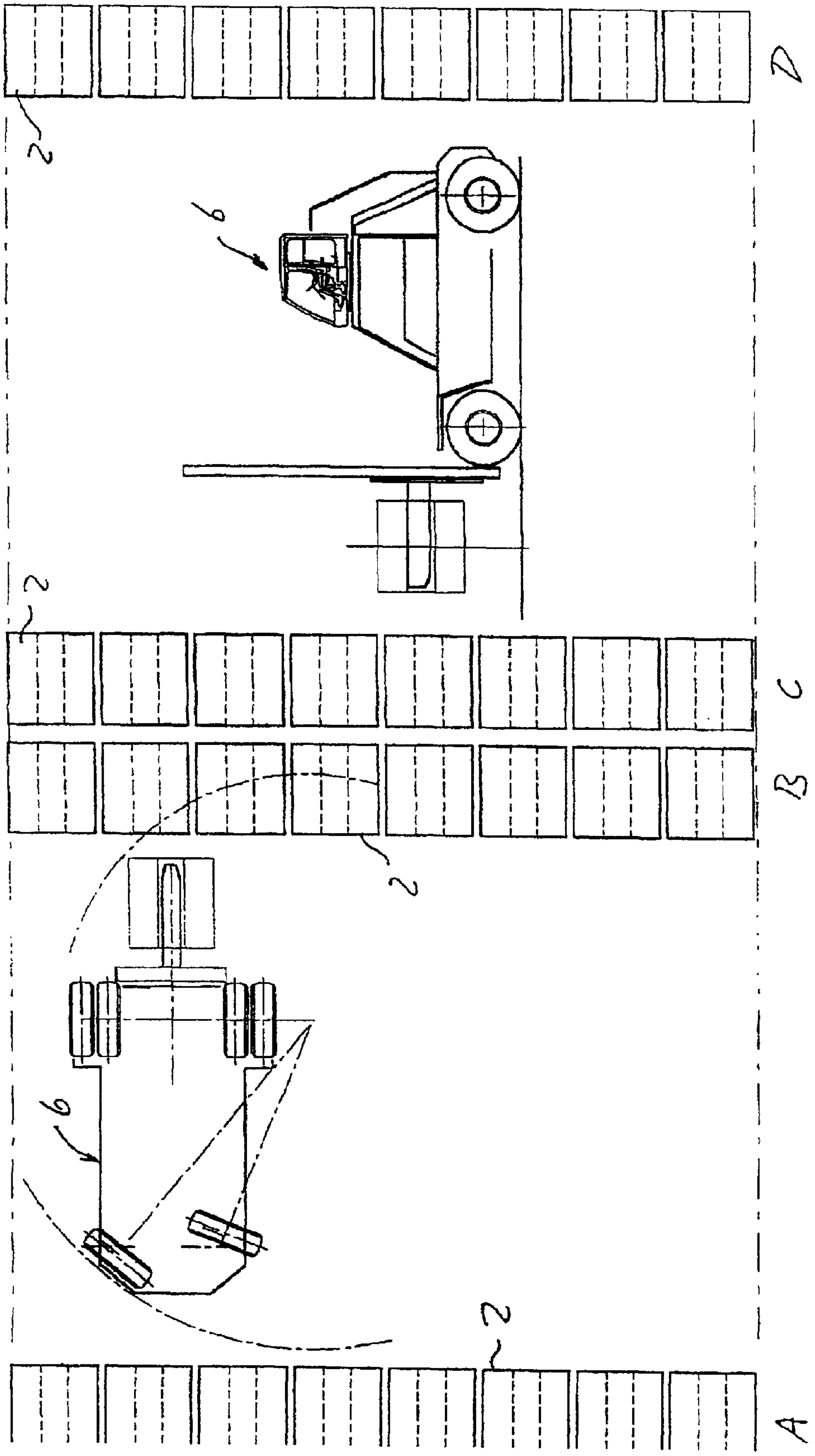
FIG. 9 is a plan view of a lift truck and of a coil store according to prior art.

Now, with reference to FIGS. 8 and 9, two plan views of a store for coils 2 are shown, in which the coils 2 are handled by using a known lift truck 6 (FIG. 9), and of a store in which the coils are handled by using a vehicle according to the present invention (FIG. 8).

In both cases, the coils 2 are arranged axially side-by-side in parallel rows A, B, C and D. It has to be noted that the two illustrated examples of stores contain the same number of coils 2 and the same number of rows. It is apparent that the store of FIG. 8 occupies a much smaller surface than the store of FIG. 9.

This result can be obtained thanks to the novel features of the vehicle according to the invention. In fact, in FIG. 9, a prior art lift truck 6 requires a considerable driving space, and the distance, for instance between the rows A and B of coils 2 must be at least slightly greater than the length dimension of the truck 6 with the means 106 for engagement with the coil. Further, the same requirement is felt in the step of loading/unloading a vehicle 5, since even in this case, there must be provided, at least on one side thereof, a free space having a width at least slightly greater than the length dimension of the truck 6, because only side loading is possible.

Figure 5A:
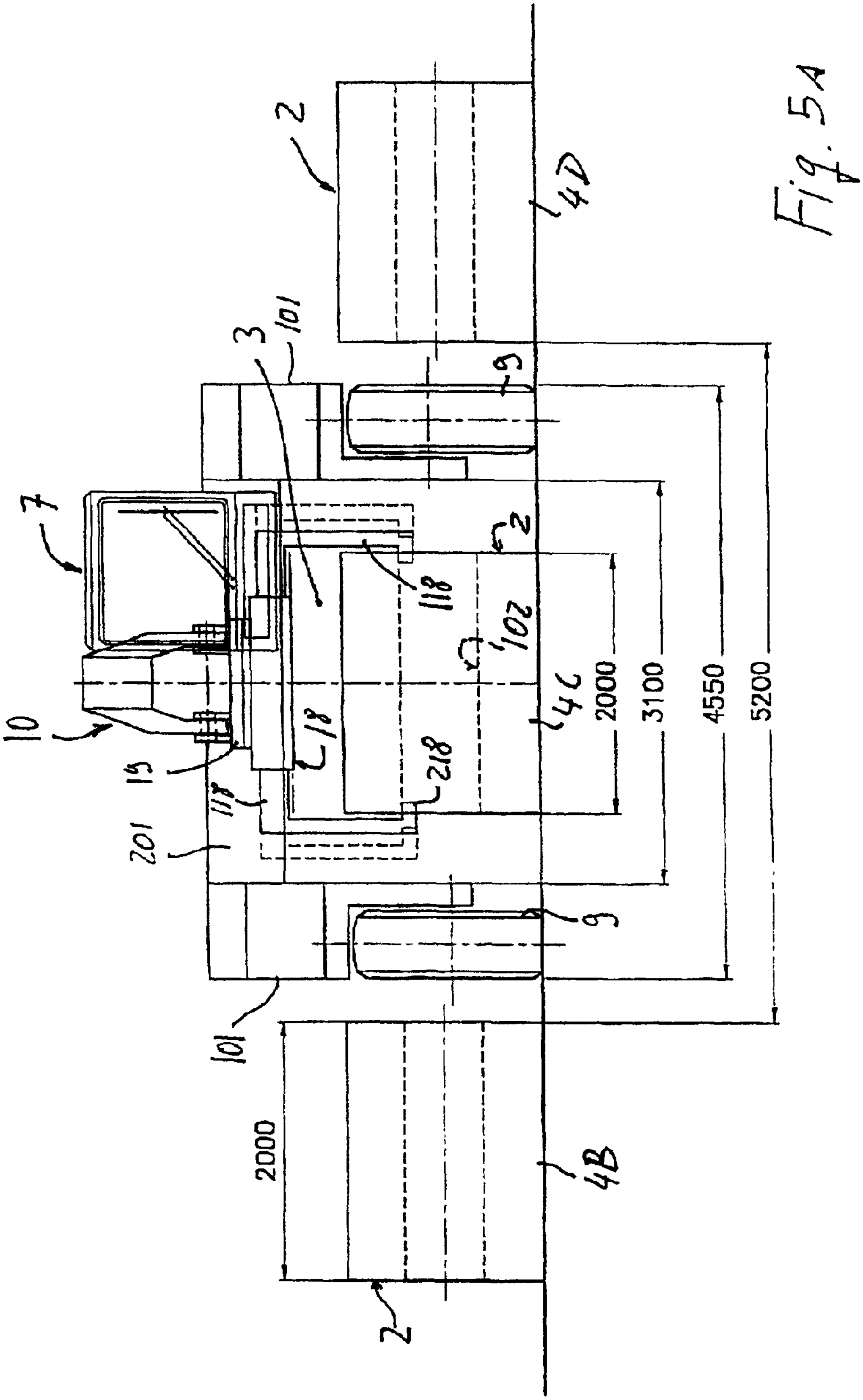
FIG. 5A is a front view of the vehicle as shown in fig. 3.
Figure 5B:
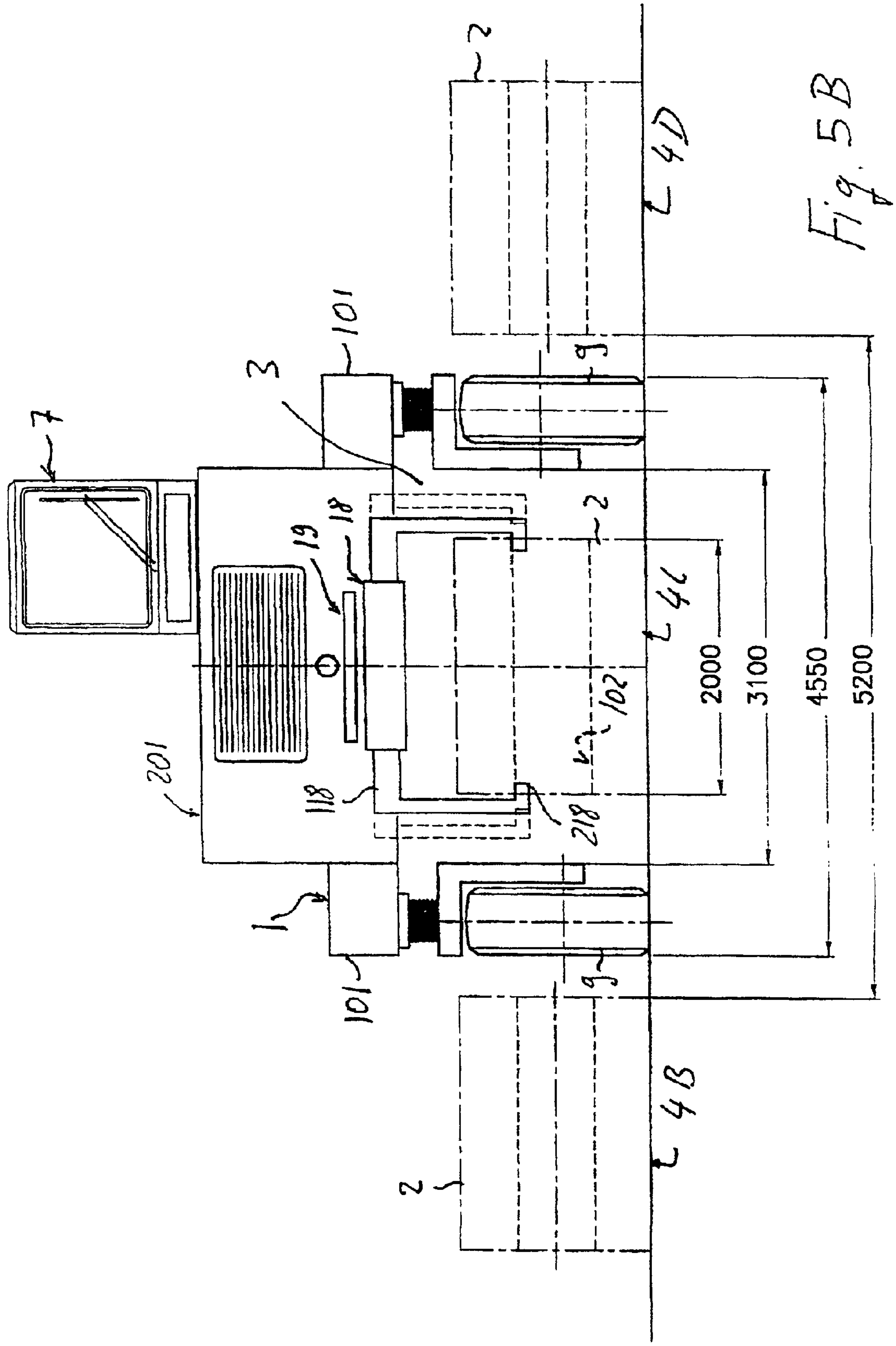
FIG. 5B is a front view of the vehicle as shown in FIG. 2, the lifting boom being omitted.

However, referring to FIGS. 8, 5A and 5B, the vehicle according to the invention may pass above the single row C of coils 2, and lift the coil 2 in a condition in which the vehicle and the row C of coils 2 are coaxial. Thanks to this arrangement, the adjacent rows of coils 2 may be spaced to a much lower extent than in the preceding case, and substantially equal to a slight higher extent than the width of each longitudinal member 101 of the frame 1. The distance between the adjacent rows will correspond, in this case, to the wheel gauge of the vehicle. Space saving as compared with prior art is apparent.

Even when the coils 2 are loaded on a vehicle 2 (FIG. 6), the required driving space is considerably reduced as compared with prior art. In fact, thanks to the size of the tunnel 3, the loading platform 105 of a vehicle 5 may easily penetrate the tunnel 3, whereby loading is effected in a manner in which the mutual position of the two vehicles is of mutual penetration, as shown in FIG. 6 obviously, the operation of unloading the vehicle 5 may be effected in the same manner.

As far as the steering and braking means and controls are concerned, as described hereinbefore, several different arrangements may be provided, which use the longitudinal members 101 of the frame 1 for the passage of control, electric, hydraulic, pneumatic lines, or the like, or of controls or drives and/or transmissions of any kind, as will be apparent for those skilled in the art.

There may be further provided usual crane truck ballasts, arranged in such positions that they cannot interfere with the tunnel aperture.

Obviously, the invention is not limited to what has been described and illustrated herein, but may be greatly varied and/or designed for handling materials other than the one described. For example, it may be arranged to be used for handling coils of paper or any other material, or there way be provided other possibly interchangeable gripping means, for handling different packages, such as bins or the like. All this without departure from the guiding principle disclosed above and claimed below.

What is claimed is:

1. A vehicle for handling coils comprising:

a) a wheeled bridging frame structure, a tunnel formed by the frame structure extending along the vehicle, the tunnel having dimensions for allowing passage of the vehicle above a coil laying on a ground and the tunnel having an axis oriented parallel to the ground and perpendicular to a longitudinal axis of the vehicle;

b) the bridging frame structure comprising a pair of framework longitudinal members, a distance between the pair of longitudinal members corresponding to or being slightly greater than an axial dimension of the coil, and a transverse structure connecting the pair of longitudinal members disposed at a height greater than a diameter of the coil;

c) an upper aperture in the tunnel between the pair of longitudinal members, the aperture having dimensions for allowing the coil to pass therethrough and to be lifted above a height of the tunnel;

d) a gripper mounted on the bridging frame structure for gripping and lifting the coils;

e) an operating cab and a motor mounted on the bridging frame structure;

wherein f) the transverse structure is limited to a rear half of the bridging frame structure;

g) the upper aperture of the tunnel is open at a front end of the bridging frame structure; and h) the gripper for lifting the coils further comprises a crane comprising a lifting boom articulated to a rear end of the vehicle at a rear of the transverse structure.

2. The vehicle of claim 1, wherein the lifting boom comprises at least two articulated elements.

3. The vehicle of claim 1, wherein the lifting boom comprises a single element.

4. The vehicle of claim 1, wherein the lifting boom comprises at least two sliding telescoping elements.

5. The vehicle of claim 1, further comprising at least one linear actuator articulated between an intermediate portion of the lifting boom and one of the pair of longitudinal members of the frame.

6. The vehicle of claim 5, further comprising a pair of linear actuators.

7. The vehicle of claim 6, wherein the actuators are oleo-pneumatic actuators.

8. The vehicle of claim 5, wherein one end of the at least one linear actuator is articulated to an intermediate position of the boom and wherein an opposite end of the at least one linear actuator is articulated to the transverse structure for connecting the two longitudinal members.

9. The vehicle of claim 1, wherein the gripper comprises at least two movable jaws, each jaw having at least one lifting tooth oriented axially with respect to the coil.

10. The vehicle of claim 9, further comprising a central cavity on the coil and opposite open ends on the central cavity of the coil, wherein the at least one tooth of each jaw is engageable in one of the opposite ends of the central cavity of the coil.

11. The vehicle of claim 10, further comprising driving means coupled to the two jaws for driving the two jaws toward each other into a position of engagement with the coil or away from each other into a position of disengagement from the coil.

12. The vehicle of claim 9, wherein a distance between the two longitudinal members forms a width of the tunnel, and wherein the width is greater than a size of the gripper in an open condition when the jaws are in a spaced apart position.

13. The vehicle of claim 12, wherein the width is along an upwardly open portion of the tunnel.

14. The vehicle of claim 1, further comprising a rotating device rotatable about an axis perpendicular to the axis of the coil, wherein the gripper is mounted on the rotating device, and a motor coupled to the rotating device for orientating the rotating device relative to the gripper.

15. The vehicle of claim 14, further comprising sliding means for mounting the gripper on the rotating device, wherein the sliding means drives the gripper relative to the rotating device for centering the gripper relative to the coil.

16. The vehicle of claim 1, further comprising a motor drive coupled to the frame structure.

17. The vehicle of claim 16, wherein the motor drive is along the longitudinal members.

18. The vehicle of claim 16, wherein the motor drive is proximal the transverse structure connecting the two longitudinal members.

19. The vehicle of claim 16, wherein the motor drive is provided in a compartment disposed at a height from the ground above the diameter of the coil.

20. The vehicle of claim 16, wherein the motor drive is provided in a compartment disposed on the longitudinal members.

21. The vehicle of claim 1, wherein the frame structure comprises at least four wheels with independent axles.

22. The vehicle of claim 21, wherein each wheel is disposed at an end of each longitudinal member.

23. The vehicle of claim 21, wherein the at least four wheels form front and rear sets of wheels and wherein a distance between the wheels of each front and rear set is equal to or greater than the distance between the two longitudinal members.

24. The vehicle of claim 23, further comprising control means for steering and braking control of at least one of the front or rear sets of wheels, the control means being independent for each wheel and comprising a control unit and control transmissions, drives, wiring and/or piping branching off the operating cab towards the sets of wheels along the longitudinal members of the frame, and steering and braking devices disposed on the longitudinal members.

25. The vehicle of claim 24, wherein each wheel is mounted on a separate axle section associated with corresponding lateral longitudinal portions of the frame, and separate braking and/or steering actuators being coupled to each wheel or at least to some of the wheels and being connected to a synchronized and/or coordinated control unit thereof, which unit is connected to controls of the operating cab.

26. The vehicle of claim 25, wherein the motor is connected to each driven wheel through separate drives for each wheel, extending within the corresponding longitudinal members of the frame.

27. The vehicle of claim 1, wherein the distance between the two longitudinal members of the frame and the height from the ground of the transverse structure for connecting the two longitudinal members are slightly greater than corresponding dimensions of loading platforms of transport motor vehicles, to allow the motor vehicles to be loaded when the loading platforms of the motor vehicles are inside the tunnel of the vehicle.

28. The vehicle of claim 1, further comprising a coil storage facility for storing the coils to be received by the vehicle, wherein the coils are arranged axially side by side in parallel rows, wherein said rows are spaced corresponding to a width of each of the two longitudinal members of the frame and the wheel gauge of the vehicle.

29. The vehicle of claim 28, wherein the coils are sheet metal coils.

30. The vehicle of claim 1, wherein the vehicle is a crane truck.

* * * * *